United States Patent [19]

Kamerling

[11] 4,071,736
[45] Jan. 31, 1978

[54] DEFROSTING MIRROR

[75] Inventor: Marc A. Kamerling, Holland, Mich.

[73] Assignee: Donnelly Mirrors, Inc., Holland, Mich.

[21] Appl. No.: 657,610

[22] Filed: Feb. 12, 1976

[51] Int. Cl.$^2$ ............................................... H05B 1/00
[52] U.S. Cl. ...................................... 219/219; 338/225
[58] Field of Search ........................ 219/219, 528/549,

[56] References Cited

U.S. PATENT DOCUMENTS

| | | | |
|---|---|---|---|
| 2,514,647 | 7/1950 | Jolliffe | 219/219 |
| 2,564,836 | 8/1951 | Elsenheimer | 219/219 |
| 3,052,787 | 9/1962 | Williams | 219/219 |
| 3,160,736 | 12/1964 | Catterson | 219/219 |
| 3,287,684 | 11/1966 | Armbruster, Jr. | 219/549 X |
| 3,296,415 | 1/1967 | Eisler | 219/528 X |
| 3,530,275 | 9/1970 | Rust | 219/219 |
| 3,597,586 | 8/1971 | Rebonch | 219/219 |
| 3,624,347 | 11/1971 | Todd et al. | 219/219 |
| 3,686,473 | 8/1972 | Shirn | 219/219 |

Primary Examiner—C. L. Albritton
Attorney, Agent, or Firm—Price, Heneveld, Huizenga & Cooper

[57] ABSTRACT

The specification discloses a defrosting mirror especially adapted for outdoor use such as on the exterior of vehicles. The mirror includes an electrically conductive, resistive coating applied to a surface of a light reflective mirror element. The coating includes microsized graphite particles dispersed throughout a resinous binder material such that electricity flows through the coating to generate heat which is transferred to the mirror element. A resinous primer layer intermediate the coating and mirror element bonds the coating to the mirror element for retention of the conductive, resistive coating especially when the mirror is exposed to humidity, salt spray, or other environmental or weather conditions.

23 Claims, 3 Drawing Figures

DEFROSTING MIRROR

BACKGROUND OF THE INVENTION

This invention relates to mirrors having the capability of being defrosted, defogged, or deiced and, more particularly, to a defrosting mirror especially adapted for outdoor use such as on the exterior of a vehicle or the like.

Defrosting mirrors and mirrors adapted for use in conditions wherein ice, frost, or moisture must be removed to provide clear, reflected images thereon have typically utilized a heat source applied to or secured near or adjacent the rear of a mirror element. In certain prior structures, resistive heating elements such as resistance wires or the like have been secured adjacent and generally parallel to the back of the mirror element and heated by the passage of electricity therethrough. The air surrounding and warmed by the elements is directed by moving air currents against the mirror element.

In other applications, resistance wire elements have been secured directly to the back of a mirror element in loop or sinuous patterns or secured between protective sheet materials which in turn are secured to the back of the mirror element. Such protective sheet materials such as asbestos have been proposed.

With the above type of heated mirrors, several drawbacks have been encountered. First, heating of the viewing surface of such mirrors was often nonuniform resulting in areas of the mirror which were deiced faster than other areas which were not deiced at all. Further, certain areas were heated to too high a temperature causing damage to the mirror elements either from breakage of the glass or other mirror substrate or degradation of the reflective coating on the mirror. Also, such mirrors, especially when used in exterior applications were subject to degradation from moisture, such as rain and/or humidity as well as the corrosive effects of salt and other chemicals present in the atmosphere especially in areas close to an ocean. This latter problem was aggravated where insulation coverings for the resistance wires were used which tended to absorb the moisture and/or salt spray. Moreover, the cost of the above type of mirrors tended to be very high even though the results obtained were often not satisfactory.

Another type of prior known heated mirror structure is that utilizing a chrome, nickel-chrome, or other thin metallic layer applied to one surface of a glass, plastic, or other mirror substrate. In certain instances, the metallic layer served both as a light-reflective layer as well as a heat conductive, resistance layer. In other applications, two layers of metallic material were used, one for light reflection and the other for heat generation. However, these types of mirrors also suffered from drawbacks during use.

For instance, it was often difficult to obtain adequate, long-term securement or adhesion to the mirrors of metallic bus bars used to convey electricity to the metallic layer. Also, because a certain thickness of metallic material was necessary to provide adequate light-reflective qualities, it was often impossible to properly control the metallic layer thickness to provide the correct electrical resistance and thus, the correct heat generation qualities. Conversely, control of the metallic layer thickness for proper heat generation qualities often produced inferior light-reflecting qualities. Further, there was often large electrical resistance encountered between the bus bar and the metallic layer resulting in problems with electrical conduction. Moreover, in those applications in which a single layer served both to reflect light and generate heat, scratches in the metallic layer would often effectively prevent electrical conduction and thus heat generation to some or all of the mirror surface even though light reflection would not necessarily be severely impaired.

In addition, other problems were encountered especially when heated mirrors were used on vehicles such as cars or trucks and subjected to snow, sleet, rain, and other severe weather conditions. Often, the heating mechanisms were so delicate that they would function improperly in anything less than optimum weather conditions.

Therefore, a substantial need has been evidenced for a defrosting or heated mirror which is durable, inexpensive to manufacture, provides high quality optical reflective qualities, and yet also provides efficient, reliable defrosting qualities even in severe environmental or atmospheric conditions. This need has been especially great for exterior mirrors used on cars and trucks, which, of necessity, must function properly in severe and widely varying conditions.

SUMMARY OF THE INVENTION

Accordingly, the present invention provides a defrosting mirror which may be inexpensively manufactured and yet is sufficiently durable and reliable to be used in even the severest of environmental or weather conditions. More specifically, the invention provides a heated or defrosting mirror including a flexible, durable, electrically conductive resistive coating applied directly to one surface of a light-reflective mirror element. The invention provides efficient, uniform heating of the entire viewing surface regardless of whether the mirror element has a first or second surface reflective coating. The electrically conductive coating is independent of the optical reflective qualities of the mirror and resists deterioration even in extreme hot or cold temperatures. The defrosting mirror thus provides both optimum reflected images and optimum heating characteristics. Retention of the conductive coating on the mirror element in wet, high humidity or salt spray conditions as well as in other severe operating environments is aided by a primer layer intermediate the coating and the surface of the mirror element to which it is applied.

In its broader aspects, the invention provides a defrosting mirror especially adapted for outdoor use such as on the exterior of vehicles or the like including a mirror element having a light-reflective coating on one surface and an electrically conductive, resistive coating applied to at least one surface of the mirror element to generate heat when electricity is conducted therethrough. The coating includes a layer of binder material and a plurality of graphite particles dispersed in contact with one another throughout the binder material. Conducting means are provided for conducting electricity to and from spaced, respectively opposing portions of the electrically conductive coating to form an electrical circuit through the coating. An adhesion promoting, primer layer, provided intermediate the mirror element surface and the electrically conductive, resistive coating, facilitates retention of the coating.

In other aspects, metallic bus bars are provided along the edges of the coating to which the electricity is provided with the coating at least partially overlapping those bus bars. An insulating coating is provided over the electrically conductive coating to prevent deterioration and/or electrical shorting thereof. Further, a thermostat may be included in the electrical circuit to govern the temperature at which the coating begins to generate heat for defrosting or defogging.

Preferably, the electrically conductive coating includes a binder formed from a solvated, fluoroelastomer polymer in which the micro-sized graphite particles are dispersed in contact with one another. The primer layer preferably is a resinous material including acrylic and phenolic resins and amino silane. The insulating coating includes a pigment dispersed in an acrylic emulsion resin vehicle or a polyurethane coating.

These and other objects, advantages, purposes, and features of the invention will become more apparent from a study of the following description taken in conjunction with the drawings.

DESCRIPTION OF THE PREFERRED EMBODIMENT

Figure 1:
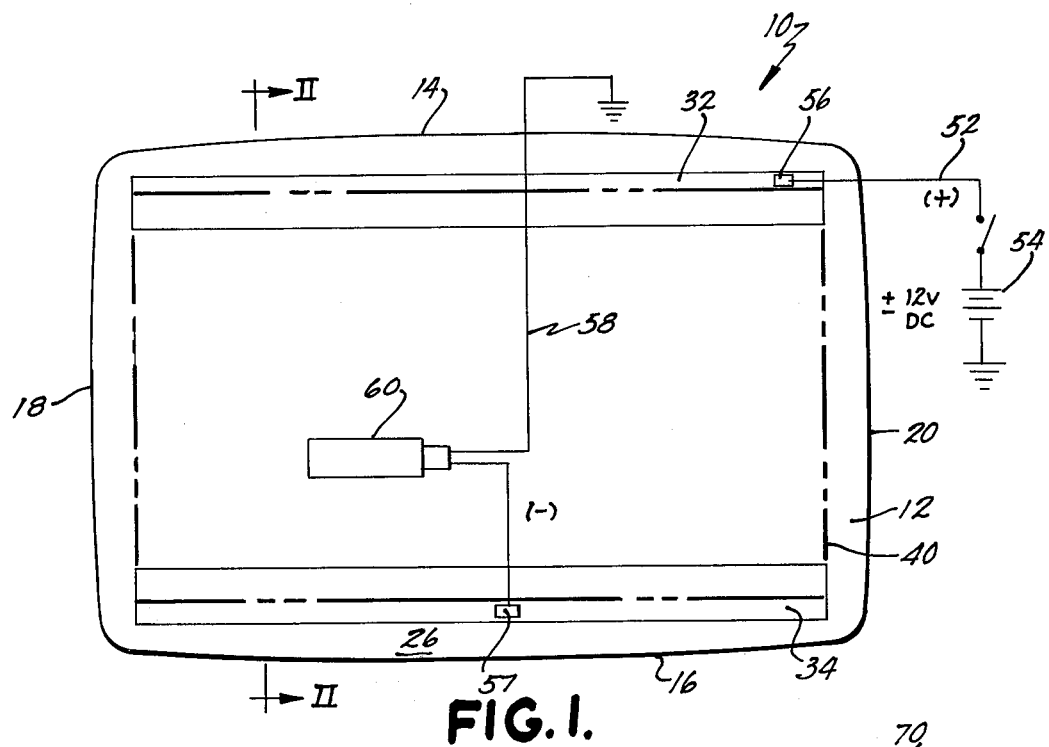
FIG. 1 is a rear elevation of the defogging mirror of the present invention including the electrically conductive resistive coating having graphite particles dispersed in contact with one another therein.
Figure 2:
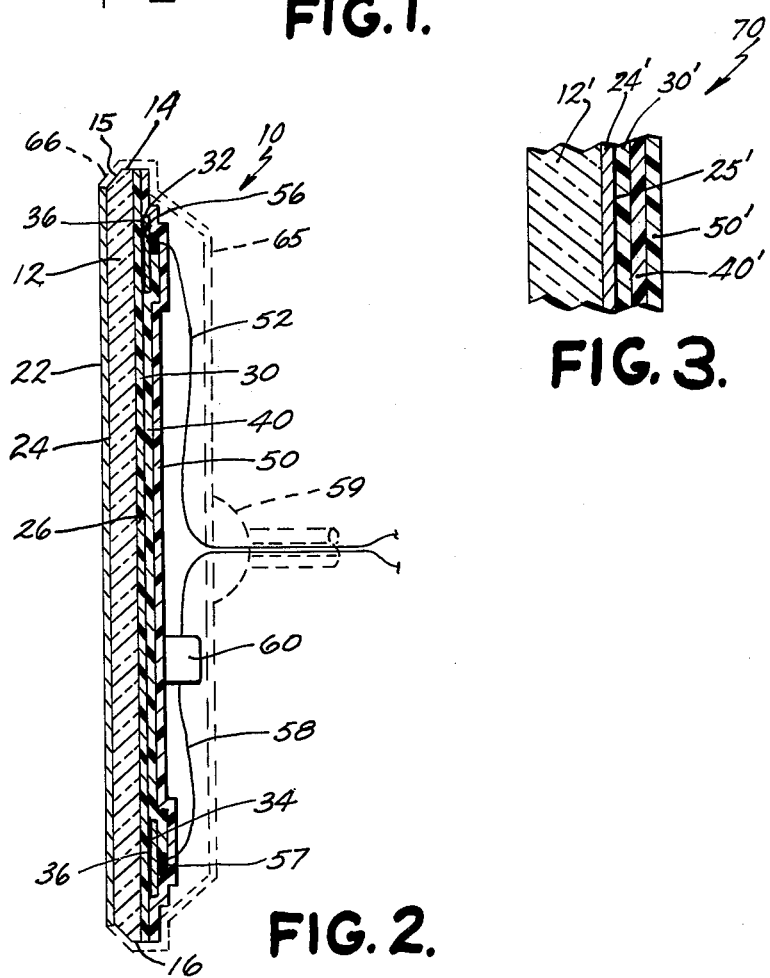
FIG. 2 is a sectional side elevation of the defogging mirror taken along plane II—II of FIG. 1 wherein the mirror element is a first or front surface mirror having the electrically conductive, resistive coating and primer layers applied to the second or rear surface.

Referring now to the drawings in greater detail, wherein the thicknesses of the various coatings and layers have been exaggerated for purposes of explanation, the preferred form 10 of the present defogging mirror is shown in FIGS. 1 and 2. The defogging mirror is of the type designed for use as an outside rearview mirror on automobiles, although the concept of the invention may be applied to other sizes and shapes of mirrors for use on trucks, other vehicles, or even in interior applications wherein the mirror may be subjected to high moisture or corrosive atmospheric conditions.

Mirror 10 includes a substrate, preferably transparent, of glass, plastic, or another material which is not attacked by the solvent chemicals necessary for application of the electrically conductive coating described hereinafter or destroyed by extreme temperatures which the mirror must withstand. Typical plastics which may be used are polycarbonates or acrylics.

In FIGS. 1 and 2, a glass substrate 12 is shown. The glass is typically rectangular including slightly radiused or arcuate longitudinal edges 14, 16 and slightly radiused or arcuate end edges 18, 20 which are shorter than edges 14, 16. Mirror 10 also includes a light-reflective layer 22 formed from chrome, nickel-chrome, or some other reflective, metallic element alloy. Reflective layer 22 may be vacuum deposited, sputtered, sprayed, or otherwise applied and adhered to the front surface 24 of mirror element 12. The electrically conductive, heat generating materials are applied to the rear surface 26 which is generally parallel to front surface 24, at least in mirrors intended for exterior application on vehicles. Of course, the heat generating materials may also be applied to prismatic or other elements, if desired.

In the preferred embodiment, the heat-generating portion of the defogging mirror 10 is provided generally by three separate layers of materials. The three layers include an electrically conductive, resistive heat-generating layer 40 sandwiched between an adhesion promoting primer layer 30 and a protective, insulating layer 50.

As is best seen in FIG. 2, primer layer 30 is a thin coating or layer of resinous material which promotes adhesion of the electrically conductive layer 40 to the mirror element and resists contamination and deterioration from salt spray, moisture and humidity. Preferably, the primer layer has a thickness of approximately 0.0002 inches and includes predetermined proportions of acrylic and modified phenolic resins along with some amino silane and an ultraviolet light absorber material. The primer is produced and sold as compound No. 0500 CD 100 by the B. F. Goodrich Chemical Company of Akron, Ohio. The ratio of the several ingredient materials is proprietary and is not publicly available from B. F. Goodrich Chemical Co. Preferably, the primer is mixed with methyl ethyl ketone solvent and sprayed on over the entire rear surface 26 of the mirror element regardless of whether the element is a first or second surface mirror. The solvent then is allowed to evaporate leaving the above-mentioned primer layer.

Although the above-described preferred primer compound may be heat activated through curing by heating the same to approximately 360° F., the primer is used in the present invention without heat curing thereby relying on its cold adhesion characteristics to retain the electrically conductive, resistive coating 40 on the mirror because of the sensitivity of the coating 40 to application of such heat. It is believed that the cold adhesion characteristics of the primer layer include primarily chemical bonding of the primer to the glass and of coating 40 to the primer although some mechanical bonding may, in fact, take place. This adhesion and bonding prevent coating 40 from stripping off in conditions of high humidity, moisture, salt spray, or the like to which an outside vehicular mirror is often subjected.

Atop the outer surface of the primer layer 30 are secured a pair of elongated, thin, flat, electrically conductive strips 32, 34 forming bus bars adjacent the upper and lower edges of the mirror. Bus bars 32, 34 are preferably formed from Scotch brand No. 1181 copper electrical tape manufactured by Industrial Electrical Products Division of 3M Corporation of St. Paul, Minn. Such tape includes an electrically conductive, pressure-sensitive adhesive layer 36 which allows the tape to be pressed and secured directly on the primer layer 30. In the preferred form, each strip is spaced slightly inboard of the edges 14 and 16 of the mirror and is approximately 0.004 inches thick, 0.375 inches wide, and extends substantially entirely across the mirror from adjacent edge 18 to adjacent edge 20. Alternatively, conductive bus bars 32, 34 may be formed from other thin strips of metal such as lead, silver, aluminum, platinim, gold, or beryllium or alloys thereof.

Over the top primer layer 30, and intermediate the bus bars 32, 34, the electrically conductive, resistive coating 40 is sprayed, painted, brushed, dipped, or otherwise applied. Coating 40 is in the range of approximately 0.0010 to 0.0030 inches thick, and preferably 0.0016 to 0.0020 inches thick. The thickness may be chosen depending on the electrical resistance and quantity of heat required for the particular mirror being used. As is seen in FIG. 2, the coating extends over the entire area intermediate bus bars 32, 34 and extends upwardly, over the thickness of, a portion of the width of, and along the entire length of each bus bar. Such application provides a secure and efficient electrical contact surface between the bus bars and coating.

Coating 40 is a flexible, tough, resilient coating formed from a resinous, fortified organic polymer preferably a solvated, fluoroelastomer polymer. The resinous material forms a binder for retention of a plurality of micro-sized graphite particles which are dispersed in contact with one another throughout the binder. This binder is resilient and not brittle, chemically inert, temperature resistant, has a low coefficient of thermal expansion and is a dielectric material. It is believed that the graphite particles are actually thin, flat, flake, or coin-like particles which engage and contact one another in edge-to-edge or overlapping relationship thereby forming an electrical circuit across the coating in all areas between the bus bars 32, 34. Each of the graphite particles has a thickness of approximately 1 micrometer ($1 \times 10^{-4}$ cm.) and a width of approximately 5 micrometers ($5 \times 10^{-4}$ cm.). Approximately 50 per cent by weight of the final coating layer 40 is graphite particles.

In the preferred embodiment, the electrically conductive coating is formed from Electrodag +502 (trademark of Acheson Industries, Inc.) compound manufactured by Acheson Industries, Inc. of Port Huron, Mich. The coating provides a controlled resistance level which may be varied by controlling the thickness of the coating and thus the number of graphite particles therein. This resistance remains substantially constant regardless of its exposure to wide variations in temperature or exposure to moisture, solvent, or chemicals. It will withstand temperatures from approximately $-40°$ F. to over 500° F.

The electrical resistance of coating 40, and thus the amount of heat generated, varies with the coating thickness. For example, with a coating 40 approximately 0.0016 to 0.0020 inches thick on a mirror having a coated area of about 9.5 inches, the power required is between about 1.3 and 1.5 watts/in² with a current draw of about 0.98 amps and a resistance of about 13.9 ohms. With a coating 40 of approximately 0.0020 inches thick on a mirror having a coated area of about $6 \times 16$ inches, the power required is about 0.9 watts/in², requiring a current draw of 1.75 amps and a resistance of 7.75 ohms.

Typically, coating 40 is sprayed on in liquid form and allowed to dry without exposure to high temperatures utilizing a solvent which evaporates during the drying process to leave the resultant coating. The preferred solvent is methyl isobutyl keytone (MIBK) although methylethyl keytone (MEK) may also be utilized. In the liquid form, approximately 77.4 per cent by weight of the coating material is solvent while the remaining approximate 12.6 per cent by weight is binder polymer and graphite particles. Alternatively, other methods for application of the coating layer may be utilized such as dipping the mirror element or painting or brushing on the coating.

As seen in FIG. 2, an overcoating, covering, or insulating layer 50 of a dielectric rubberized material or acrylic resin with a pigment therein or polyurethane is applied over the entirety of the electrically conductive, resistive coating 40 such that it extends outwardly over the uncoated portions of the bus bars 32, 34 and the uncovered primer layer 30 to the edges of the mirror element 10. Preferably, layer 50 has a uniform thickness within the range of approximately 0.002 to 0.010 inches. Overcoat or insulation layer 50 protects against deterioration of the electrically conductive coating 40 from scraping or rubbing and also prevents contact of moisture with the bus bars and coating to prevent shorting of the electrical circuit. Preferably, the material has high dielectric or insulating qualities, is applied by spraying, and cured by drying. Materials found suitable for coating 50 include any one of the 5700 System, Rust-O-Crylic (registered trademark of Rust-Oleum Corp.) protective coatings manufactured by Rust-Oleum Corporation of Evanston, Ill. These coatings include an acrylic emulsion resin as a coating vehicle with pigment added to provide color. Alternatively, a layer of clear polyurethane may be used. A preferred polyurethane in solvated form is Hysol PC 28 STD manufactured by Hysol Division of Dexter Corporation. the Hysol coating has good electrical insulating qualities and also prevents corrosion.

Electrical connection of the bus bars is made by connecting a wire lead 52 from a battery or other electrical source 54, preferably of 6 or 12 volts DC, which is soldered at 56 to bus bar 32 prior to the application of insulation coating 50. A second wire lead 58 is soldered at 57 to an uncoated portion of bus bar 34 also prior to the application of the insulation coating. Connected in series along wire lead 58 is a conventional thermostat 60 for controlling the temperature at which operation of the defrosting mirror begins. A thermostat found suitable is that produced as Model B by Portage Electrical Products, Inc. of North Canton, Ohio. Such thermostat is adhered directly to insulating layer 50 when that layer is still tacky after application or otherwise secured with adhesive to that layer such that it is electrically insulated from coating 40.

Thermostat 60, which primarily senses the temperature of the heated mirror element rather than atmospheric temperature, is preferably set to close, i.e., allow current to flow through electrical circuit, when the mirror is at any temperature below approximately 55° F. with a tolerance range for the beginning of operation of plus or minus 15° F. Typicaly, the thermostat is set such that no electrical current flows above the temperature falling in this range. The thermostat preferably will open, i.e., shut off current flow at a temperature no higher than approximately 100° F. plus or minus approximately 15° F. Further, if the mirror is utilized on a vehicle including a defrosting rear window or other defrosting rear window or other defrosting circuitry, the defrosting mirror 10 may be connected in parallel with such defrosting unit in place of a switch such as that at 59 (FIG. 1). In such case, both the rear window defogger and the heated mirror begin operation simultaneously.

Figure 3:
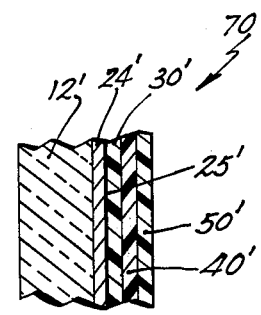
FIG. 3 is a fragmentary, sectional view of another embodiment of the defogging mirror wherein the electrically conductive, resistive coating and primer layers are applied over the light-reflective coating on a second or rear surface mirror.

Referring now to FIG. 3, a section of an alternative embodiment 70 of the defrosting mirror is illustrated wherein the heating layers including primer layer 30', electrically conducting resistive layer 40', and insulating overcoat 50' are applied directly over the metallic, light-reflective layer 24' applied to the rear surface 26° of a mirror element 12'. The layers 30', 40', and 50', are all exactly similar to those utilized in the embodiment 10 of the invention. Electrical circuitry and a thermostat like those used in embodiment 10 may also be used in mirror 70. The operating characteristics of the defrosting mirror having the heating portions applied to the second surface mirror 70 are substantially the same as those for embodiment 10 of the invention. Heat generated by coating 40' is transmitted additionally through reflective coating 24' and then to the transparent substrate. However, since coating 24' is formed from a metal or metallic alloy having an excellent thermoconductivity, such transmission provides little difference in overall heating characteristics. Care must be taken with embodiment 70 to ensure that coating 40' is properly insulated from reflective coating 24' so that the electricity is not conducted by the metallic reflective coating. For this purpose, any paint conventionally used to cover the reflective layer during production of conventional second surface mirrors may be applied as a coating 25' over coating 24' and before primer 30'. Primer 30' also helps to provide such insulation.

As shown in FIG. 2, the defrosting mirrors 10 or 70 may be encased in a plastic, metal, or other casing 65 including peripheral edge portions 66 bent over or engaging a beveled edge 15 on the mirror element. The rear of such a case includes a back portion spaced away from the heating portion and provides room for mounting thermostat 60 directly on the insulating coating 50. Such a case typically also includes a ball and socket or other pivot arrangement shown generally at 59 including a passageway therethrough through which the wire leads 52, 58 pass for connection to the electrical circuitry of the vehicle on which the mirror is mounted. Other cases may also be used such as those including foamed plastic molded around mirrors 10 or 70 or the like.

With either the first or second reflective surface embodiments 10 or 70 of the defrosting mirror, the thickness of coating 40 is predetermined to provide a defrosting time of approximately five minutes or less for clearing approximately 95 per cent of the mirror surface with a coating of ice having a thickness of 0.018 inches and an initial temperature of 0° F. when operation begins. Thus, the time period required for 95 per cent deicing and the mirror size are the principal factors in determining the power requirement and thus the thickness of coating 40 or 40'. It has been found that a thickness of coating 40 of approximately 0.0016 to 0.002 inches on a mirror having a coated area of about 4½ × 2¼ inches provides a minimum of 1.2 watts/in$^2$ which deices approximately 95 per cent of a first surface mirror in 5 minutes or less at 0 mph wind, 0° F. ambient temperature, and ice 0.018 inches thick initially.

Accordingly, the present invention provides an efficient, fast-operating, durable defrosting mirror which is unaffected by high humidity, moisture, or salt spray conditions. By utilizing the electrically conductive coating 40 having micro-sized graphite particles dispersed within a tough, resilient, flexible binder layer, the defrosting mirror has a long life even though the electrically conducted coating is relatively thin. Moreover, the mirror may be inexpensively produced because of the minimal thickness required for the necessary resistance of the coating.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A defrosting mirror especially adapted for outdoor use on the exterior of vehicles or the like comprising:
    a mirror element having a light-reflective coating on one surface thereof;
    an electrically conductive, resistive, coating applied over at least one surface of said mirror element to generate heat when electricity is conducted therethrough, said coating including a layer of binder material adhering to said mirror surface and a plurality of graphite particles dispersed in contact with one another throughout said binder material;
    conducting means for conducting electricity to and from respectively opposing portions of said electrically conductive coating to form an electrical circuit through said coating, said opposing portions being spaced apart across said one surface of said mirror element over which said electrically conductive coating is applied; and
    an adhesion promoting, primer layer intermediate said one surface of said mirror element and said electrically conductive, resistive coating and uniformly contacting said mirror element surface and electrically conductive coating and bonded to said surface and coating to facilitate retention of said coating on said mirror element especially when said mirror is exposed to moisture, humidity, salt spray or solutions, or other environmental or weather conditions;
    said electrically conductive, resistive coating being applied directly to and over said adhesion promoting primer layer and uniformly contacting said primer layer to ensure proper retention of said coating to said mirror element, while the electrically conductive coating ensures substantially constant electrical resistance and uniform heating of said mirror element.

2. The defrosting mirror of claim 1 wherein said binder material is a resinous material.

3. The defrosting mirror of claim 2 wherein said resinous material is a fortified organic polymer.

4. The defrosting mirror of claim 3 wherein said fortified organic polymer is a fluoroelastomer polymer.

5. A defrosting mirror especially adapted for outdoor use on the exterior of vehicles or the like comprising:
    a mirror element having a light-reflective coating on one surface thereof;
    an electrically conductive, resistive, coating applied to at least one surface of said mirror element to generate heat when electricity is conducted therethrough, said coating including a layer of binder material adhering to said mirror surface and a plurality of graphite particles dispersed in contact with one another throughout said binder material;
    conducting means for conducting electricity to and from respectively opposing portions of said electrically conductive coating to form an electrical circuit through said coating, said opposing portions being spaced apart across said one surface of said mirror element to which said electrically conductive coating is applied; and
    an adhesion promoting, primer layer intermediate said one surface of said mirror element and said electrically conductive, resistive coating to facilitate retention of said coating on said mirror element especially when said mirror is exposed to moisture, humidity, salt spray or solutions, or other environmental or weather conditions;

said binder material being a resinous material including a fluoroelastomer polymer;

said graphite particles being micro-sized, coinlike particles dispersed such that they overlap and contact one another to form the electrical circuit.

6. The defrosting mirror of claim 1 wherein said electrically conductive, resistive coating is applied to the rear surface of said mirror element; said light-reflective coating being applied to the front surface of said mirror element.

7. The defrosting mirror of claim 1 wherein said light-reflective coating is applied directly to the rear surface of said mirror element; said primer layer and electrically conductive, resistive coating being applied successively over a coating of insulating paint applied over said reflective coating on said rear surface.

8. The defrosting mirror of claim 1 further including a layer of insulating material applied over said electrically conductive coating to protect said coating and prevent electrical shorting of the electrical circuit.

9. The defrosting mirror of claim 8 wherein said insulating material is a layer including acrylic emulsion resin.

10. The defrosting mirror of claim 8 wherein said insulating material is a layer including polyurethane.

11. The defrosting mirror of claim 8 including a thermostat for regulating the flow of electricity through said conducting means and electrically conductive coating, said thermostat being adhered to said layer of insulating material.

12. The defrosting mirror of claim 1 wherein said conducting means includes a thermostat for regulating the flow of electricity and thus, a quantity of heat produced by said electrically conductive coating.

13. The defrosting mirror of claim 1 wherein said primer layer includes adhesion promoting plastic resin.

14. A defrosting mirror especially adapted for outdoor use on the exterior of vehicles or the like comprising:
a mirror element having a light-reflective coating on one surface thereof;
an electrically conductive, resistive, coating applied to at least one surface of said mirror element to generate heat when electricity is conducted therethrough, said coating including a layer of binder material adhering to said mirror surface and a plurality of graphite particles dispersed in contact with one another throughout said binder material;
conducting means for conducting electricity to and from respectively opposing portions of said electrically conductive coating to form an electrical circuit through said coating, said opposing portions being spaced apart across said one surface of said mirror element to which said electrically conductive coating is applied; and
an adhesion promoting, primer layer intermediate said one surface of said mirror element and said electrically conductive, resistive coating to facilitate retention of said coating on said mirror element especially when said mirror is exposed to moisture, humidity, salt spray or solutions, or other environmental or weather conditions;
said primer layer including an adhesion promoting plastic resin having acrylic and phenolic resins and amino silane.

15. The defrosting mirror of claim 1 wherein said conducting means include a pair of spaced, elongated electrically conductive metallic strips adhered to said primer layer to which said electrically conductive coating is applied, said electrically conductive coating contacting each of said strips along the entire length of each of said strips.

16. The defrosting mirror of claim 15 wherein each of said strips has a predetermined thickness, said electrically conductive coating extending over at least one edge, and thus, overlapping the thickness of said metallic strips along their entire lengths.

17. A defrosting mirror especially adapted for exterior use on vehicles or in other weather and environment exposed conditions comprising:
a mirror element having front and back surfaces and a light-reflective coating on at least one of said surfaces;
a primer layer applied directly on said back surface of said mirror element;
a pair of electrically conductive strips spaced apart from one another adjacent opposite edges of said mirror element and secured to the back of said mirror element;
an electrically conductive, resistive coating applied to the back surface of said mirror element and directly on and over said primer layer to generate heat when electricity is conducted therethrough, said coating electrically contacting each of said electrically conductive strips and extending across and covering the area of said back of said mirror element intermediate said spaced electrically conductive strips, said coating including a layer of binder material adhering to said primer layer and a plurality of graphite particles dispersed within said binder material and sufficiently in contact with one another to conduct electricity through said coating between said conductive strips;
means for conducting electricity to said electrically conductive strips, and thus, to said electrically conductive, resistive coating;
said primer layer being intermediate said mirror element back surface and said electrically conductive, resistive coating for facilitating adherence of said electrically conductive, resistive coating to said mirror element especially when said mirror is exposed to moisture, humidity, salt spray or solutions, or other environmental or weather conditions, said primer layer uniformly contacting and adhering to said mirror element back surface and said electrically conductive, resistive coating and bonded to said surface and coating;
said electrically conductive, resistive coating uniformly contacting said primer layer to ensure proper retention of said coating to said mirror element while said electrically conductive coating ensures substantially constant resistance and uniform heating of said mirror element.

18. The defrosting mirror of claim 17 wherein said binder material is a resinous material.

19. The defrosting mirror of claim 18 wherein said resinous material is a fluoroelastomer polymer.

20. The defrosting mirror of claim 19 further including a layer of insulating material applied over said electrically conductive coating to protect said coating and prevent electrical shorting of the electrical circuit.

21. A defrosting mirror especially adapted for exterior use on vehicles or in other weather and environment exposed conditions comprising:

a mirror element having front and back surfaces and a light-reflective coating on at least one of said surfaces;

a pair of electrically conductive strips spaced apart from one another adjacent opposite edges of said mirror element and secured to the back of said mirror element;

an electrically conductive, resistive coating applied to the back surface of said mirror element to generate heat when electricity is conducted therethrough, said coating electrically contacting each of said electrically conductive strips and extending across and covering the area of said back surface intermediate said spaced electrically conductive strips, said coating including a layer of binder material adhering to said mirror back surface and a plurality of graphite particles dispersed within said binder material and sufficiently in contact with one another to conduct electricity through said coating between said conductive strips;

means for conducting electricity to said electrically conductive strips, and thus, to said electrically conductive, resistive coating; and a primer layer intermediate said mirror element back surface and said electrically conductive, resistive coating for facilitating adherence of said electrically conductive, resistive coating to said mirror element especially when said mirror is exposed to moisture, humidity, salt spray or solutions, or other environmental or weather conditions;

said binder material is a resinous material including a fluoroelastomer polymer;

said primer layer including acrylic and phenolic resins and amino silane; and a layer of insulating material applied over said electrically conductive coating to protect said coating and prevent electrical shorting of the electrical circuit.

22. The defrosting mirror of claim 20 wherein said conducting means includes a thermostat for regulating the flow of electricity, and thus, the quantity of heat produced by said electrically conductive coating.

23. The defrosting mirror of claim 22 wherein said electrically conductive strips include elongated strips of metallic tape adhered to said primer layer; said conducting means being soldered to said metallic strips.

* * * * *

UNITED STATES PATENT AND TRADEMARK OFFICE
CERTIFICATE OF CORRECTION

PATENT NO. : 4,071,736
DATED : January 31, 1978
INVENTOR(S) : Marc A. Kamerling

It is certified that error appears in the above-identified patent and that said Letters Patent are hereby corrected as shown below:

Column 1, Line 31:

"other areas which were not" should be --other areas or areas which were not--.

Column 6, Line 16:

"Alternatively" should be --Alternately--.

Column 6, Line 62:

"26°" should be --26'--.

Signed and Sealed this

Third Day of October 1978

[SEAL]

Attest:

RUTH C. MASON
Attesting Officer

DONALD W. BANNER
Commissioner of Patents and Trademarks